United States Patent
Palmqvist et al.

(10) Patent No.: US 10,115,971 B2
(45) Date of Patent: Oct. 30, 2018

(54) FUEL CELL ELECTRODE HAVING POROUS CARBON CORE WITH MACROCYCLIC METAL CHELATES THEREON

(75) Inventors: Anders Palmqvist, Mölndal (SE); Kjell Fossum, Stenungsund (SE)

(73) Assignee: APPEM Ltd., Nicosia (CY)

( * ) Notice: Subject to any disclaimer, the term of this patent is extended or adjusted under 35 U.S.C. 154(b) by 496 days.

(21) Appl. No.: 13/885,139

(22) PCT Filed: Nov. 14, 2011

(86) PCT No.: PCT/SE2011/051364
§ 371 (c)(1),
(2), (4) Date: Aug. 27, 2013

(87) PCT Pub. No.: WO2012/064279
PCT Pub. Date: May 18, 2012

(65) Prior Publication Data
US 2013/0330658 A1    Dec. 12, 2013

Related U.S. Application Data

(60) Provisional application No. 61/412,814, filed on Nov. 12, 2010.

(51) Int. Cl.
*H01M 4/86* (2006.01)
*B01J 31/16* (2006.01)
(Continued)

(52) U.S. Cl.
CPC ....... *H01M 4/8652* (2013.01); *B01J 31/1625* (2013.01); *B01J 31/183* (2013.01);
(Continued)

(58) Field of Classification Search
CPC .............................. H01M 4/8652; H01M 8/00
(Continued)

(56) References Cited

U.S. PATENT DOCUMENTS

| 7,419,772 B2 * | 9/2008 | Watkins | B01D 67/003 |
| | | | 257/E21.273 |
| 2003/0175579 A1 | 9/2003 | Uchida et al. | |

(Continued)

FOREIGN PATENT DOCUMENTS

GB    2108312 A    5/1983

OTHER PUBLICATIONS

Choma et al., "Adsorption Properties of Phenolic Resin-Based Mesoporous Carbons Obtained by Using Mixed Templates of Pluronic F127 and Brij 58 or Brij 78 Polymers," Adsorption, vol. 16, No. 4-5, Oct. 2010, pp. 377-383.
(Continued)

Primary Examiner — Miriam Stagg
Assistant Examiner — Victoria H Lynch
(74) Attorney, Agent, or Firm — Locke Lord LLP; Nicholas J. DiCeglie, Jr.

(57) ABSTRACT

The invention concerns a method for manufacturing of an electrocatalyst comprising a porous carbon support material, a catalytic material in the form of at least one type of metal, and macrocyclic compounds chemically bound to the carbon support and capable of forming complexes with single metal ions of said metal or metals, said method comprising the steps of: i) providing a template capable of acting as pore structure directing agent during formation of a highly porous electrically conducting templated carbon substrate, ii) mixing the template with one or several precursor substances of the catalytic material, the macrocyclic compounds and carbon, iii) exposing the mixture of the template and the precursor substances to a carbonization process during which the precursors react and transform the mixture into a carbonized template composite in which the carbon part of the composite is chemically bound to macrocyclic compounds present in complexes with the metal or metals. The (Continued)

invention also concerns an electrocatalyst for electrochemical reactions, a method for manufacturing of a membrane electrode assembly using such an electrocatalyst and to a fuel cell making use of such an electrocatalyst.

21 Claims, 3 Drawing Sheets

(51) Int. Cl.
  B01J 31/18 (2006.01)
  H01M 4/88 (2006.01)
  H01M 4/90 (2006.01)
  H01M 8/1004 (2016.01)
  H01M 8/00 (2016.01)
(52) U.S. Cl.
  CPC ....... *B01J 31/1815* (2013.01); *H01M 4/8828* (2013.01); *H01M 4/9008* (2013.01); *H01M 8/00* (2013.01); *H01M 8/1004* (2013.01); *B01J 2531/025* (2013.01); *B01J 2531/0216* (2013.01); *B01J 2531/16* (2013.01); *B01J 2531/26* (2013.01); *B01J 2531/38* (2013.01); *B01J 2531/56* (2013.01); *B01J 2531/64* (2013.01); *B01J 2531/66* (2013.01); *B01J 2531/72* (2013.01); *B01J 2531/842* (2013.01); *B01J 2531/845* (2013.01); *B01J 2531/847* (2013.01); *Y02P 70/56* (2015.11)

(58) Field of Classification Search
  USPC .................................................. 429/532, 535
  See application file for complete search history.

(56) References Cited

U.S. PATENT DOCUMENTS

| 2006/0063055 | A1 | 3/2006 | Frey et al. |
| 2006/0166811 | A1 | 7/2006 | Huang et al. |
| 2007/0042268 | A1 | 2/2007 | Pak et al. |
| 2007/0086954 | A1 | 4/2007 | Miller |
| 2008/0286490 | A1 | 11/2008 | Bogdanoff et al. |
| 2008/0312073 | A1 | 12/2008 | Olson et al. |
| 2008/0318103 | A1 | 12/2008 | Tsuji et al. |
| 2010/0048380 | A1* | 2/2010 | Calabrese Barton ........................ H01M 4/881 502/5 |
| 2010/0167106 | A1* | 7/2010 | Pak ..................... H01M 4/8814 429/525 |

OTHER PUBLICATIONS

Lee et al., "Recent Progress in the Synthesis of Porous Carbon Materials," Advanced Materials, vol. 18, No. 16, Aug. 2006, pp. 2073-2094.
Bezerra et al., Electrochimica Acta, vol. 53, pp. 4937-4951, 2008.
Choi et al., Chemical Communications, vol. 1, pp. 2136-2137, 2003.

* cited by examiner

FUEL CELL ELECTRODE HAVING POROUS CARBON CORE WITH MACROCYCLIC METAL CHELATES THEREON

CROSS REFERENCE TO RELATED APPLICATIONS

This application is a U.S. National Phase patent application of PCT/SE2011/051364, filed Nov. 14, 2011, which claims priority to U.S. Provisional Patent Application No. 61/412,814, filed Nov. 12, 2010, each of which is hereby incorporated by reference in the present disclosure in its entirety.

TECHNICAL FIELD

This invention relates to an electrocatalyst for electrochemical reactions and to its method of manufacturing. The invention further relates to a method for manufacturing of a membrane electrode assembly using such an electrocatalyst and to a fuel cell making use of such an electrocatalyst.

BACKGROUND OF THE INVENTION

The present invention concerns in general catalysts useful for either catalytic reduction or catalytic oxidation reactions, and more particularly, to electrocatalysts useful as electrodes in fuel cells.

The increasing need for power generation based on non-fossil fuels and with low emissions of pollutants is expected to favor the employment of fuel cells in applications for transportation and power generation.

Fuel cells efficiently convert chemical energy stored in a fuel to electricity through an electrochemical reaction between the fuel and an oxidant (normally oxygen in air), where the reactants are supplied to a pair of electrodes separated by and in contact with an electrolyte, which may be solid or liquid and which transports ions from one of the electrodes to the other, while electrons generated at one electrode are transported to the other electrode through an external load thus producing an electrical current. The oxidation of the fuel takes place on an electrode called the anode, whereas the reduction of the oxidant takes place on an electrode called the cathode. Fuels used in fuel cells may be of different types which may require different operation temperatures and specific designs of the fuel cell to be efficiently converted. Hydrogen, methanol and dimethyl ether are desirable fuels because they can be readily converted at low temperature. Hydrogen is problematic to obtain free from trace amounts of carbon monoxide, which may decrease the conversion efficiency of the fuel on the anode due to poisoning of the catalyst, and in addition hydrogen is problematic to store and transport efficiently.

Methanol and dimethyl ether may be more easily stored and transported than hydrogen, but may also form reaction byproducts, such as carbon monoxide during reaction and in addition may induce lower conversion efficiencies at the cathode if they leak through the electrolyte and there either consume oxygen or poison the cathode catalyst thus rendering it less efficient for oxidant reduction.

For practical purposes the electrocatalysts should preferably be tolerant to poisoning of trace amounts of reaction byproducts or impurities in the fuel or the oxidant stream and to non-desired diffusion of fuel or oxidant across the electrolyte. This means that the catalyst should preferably not react with or catalyse reaction of the compound in question with oxygen but instead remain unaffected by its presence and thus allow for its venting out with the product stream.

The electrodes are typically made up of an electrically conducting electrode substrate and a catalyst layer coated onto the surface of the substrate. The state-of-the-art electrode catalyst typically constitutes finely divided particles of metal, such as platinum or alloys with platinum, with the size of a few nanometers, dispersed on the electrode substrate, typically a carbon powder, to catalyze the desired electrochemical reaction.

The overall fuel conversion rate of an electrode is the combination of the specific activity of its catalytic active sites, the so called turn-over-frequency, and the number of such active sites present in the electrode structure.

In operation of a hydrogen-fuelled fuel cell, hydrogen is provided to the anode electrode where it is oxidized, and protons and electrons are formed. The protons and electrons thus formed are transported through the proton-conducting electrolyte and the external current lead, respectively to the cathode electrode, to which oxygen is provided and reacts with the electrons and protons from the anode to form water. The water thus formed needs to be transported away from the cathode electrode to avoid mass transport limitations of the oxygen to the catalyst on the cathode.

To achieve an operational fuel cell, the structure of the electrodes needs to be designed such that they provide an interface between the three phases (gas, liquid and solid) at which the reactants, electrons and protons meet and react and where the product forms at different stages of the operation of the fuel cell.

Platinum is an expensive metal and a very limited natural resource, which is why alternative electrocatalysts are being sought. Metal-containing macrocyclic compounds, such as, $N_4$-chelate compounds like metalloporphyrins, porphyrins, phtalocyanines and tetraazaannulenes have been found active as electrocatalytic active sites for reduction of oxygen with very high 4-electron transfer properties. See, for example, Bezerra et al., Electrochimica Acta, Vol. 53, pp. 4937-4951, 2008. Combinations of more than one such metal-containing macrocyclic compound have been found to result in cathode electrocatalysts that are fuel tolerant. However, these types of metal-containing macrocyclic compounds have not been shown possible to incorporate efficiently in sufficiently high amounts in electrodes to render the reactant conversion over the catalyst practically useful for their application in electrodes.

BRIEF SUMMARY OF THE INVENTION

An efficient electrode needs to have highly active and selective electrocatalytic active sites for the preferred reaction (in scientific terms it needs to exhibit high turn-over-frequencies) and in addition provide a large interface area at the three-phase boundary between the gas phase, the liquid phase and the solid phases present in the fuel cell device to allow for efficient transport of reactants and products to the electrocatalyst active sites, through which efficient transfer of ions and electrons between reactants are facilitated.

While, much effort has been spent on finding active catalyst materials with high turn-over-frequencies, for such catalysts to render an electrode a high fuel conversion rate, the highly active and selective electrocatalytic active sites need to be integrated with an electrically conducting substrate which has a high surface area and is highly porous, the optimum nature of which depends on the type of active site.

Electrically conducting carbon materials with exceptionally high surface area and porosity can be made by deliberate structuring at the micro-, meso- and macroscale (IUPAC nomenclature used) during their preparation by the use of a template, which may be either in molecular or supramolecular assembly form or in the form of a liquid or a solid that may be selectively removed from the carbon once it has been formed in the presence of the template. Such carbons are called templated carbons or templated carbon materials. Types of carbon materials that are encompassed in this description are, for example, ordered mesoporous carbons (OMC), mesocellular foams of carbon and inverse colloidal crystal structures of carbon. The porosity and surface area of templated carbon materials may be tuned into the desired range through choice of template and processing conditions, and the atomic ordering of the carbon, which may range from amorphous to ordered form, can be affected by synthesis precursors used and processing conditions employed.

The present invention provides electrodes in which electrocatalytically active sites based on metal-containing macrocyclic compounds, including, for example, $N_4$-chelate compounds like metalloporphyrins, porphyrins, phtalocyanines and tetraazaannulenes or other metal-containing complexes with nitrogen, sulfur, oxygen, silicon, boron or phosphorous incorporated into and integrated with an electrically conducting templated carbon substrate which has a high surface area and is highly porous, such as, for example, an OMC support; and methods of preparing efficient electrodes of such electrocatalysts; and applications of the same electrodes in electrochemical apparatuses, including, but not limited to, the application as cathode in fuel cells fuelled by hydrogen, methanol or dimethyl ether.

The general objective of the invention is to provide an electrode structure in which catalytically active sites consisting of metal-containing macrocyclic compounds, including, for example, $N_4$-chelate compounds like metalloporphyrins, porphyrins, phtalocyanines and tetraazaannulenes or other metal-containing complexes with nitrogen, sulfur, oxygen, silicon, boron or phosphorous, facilitating an efficient electron transfer process during electrocatalytic reaction are incorporated in and integrated with an electrically conducting templated carbon material designed such that it provides a suitable porosity and a high interface area at the three-phase boundary between gas, liquid and solid components of the structure at which the reactants, electrons and protons meet and react and where the product forms during the operation of the apparatus.

Accordingly, it is an objective of the present invention to improve the performance of non-platinum fuel cells fuelled with hydrogen, methanol or dimethyl ether.

It is another objective of the present invention to improve the oxygen reduction efficiency at the cathode in non-platinum electrochemical fuel cells fuelled with hydrogen, methanol or dimethyl ether.

It is yet another objective of the present invention to provide alternative electrocatalysts exhibiting high conversion rates for electrocatalytic oxygen reduction at the cathode in electrochemical fuel cells fuelled with hydrogen, methanol or dimethyl ether.

It is a further objective of the present invention to provide alternative electrocatalysts, which exhibit high conversion rates for electrocatalytic oxygen reduction and low conversion rates for fuel oxidation as well as low sensitivity to poisoning by the fuel when operated in electrochemical fuel cells fuelled with hydrogen, methanol or dimethyl ether.

Finally, another objective of the present invention is to provide methods of making the alternative electrocatalyst materials having the foregoing properties.

In satisfaction of the foregoing objectives and advantages, the present invention provides a new family of electrocatalysts and electrode materials having a structure in which catalytically active sites consisting of metal-containing macrocyclic compounds, including, for example, $N_4$-chelate compounds like metalloporphyrins, porphyrins, phtalocyanines and tetraazaannulenes or other metal-containing complexes with nitrogen, sulfur, oxygen, silicon, boron or phosphorous facilitating an efficient electron transfer process during electrocatalytic reaction are incorporated in and integrated with an electrically conducting templated carbon material designed so as to provide a suitable porosity and a high interface area at the three-phase boundary between gas, liquid and solid components of the structure at which the reactants, electrons and protons meet and react and where the product forms during the operation of the apparatus.

The invention concerns a method for manufacturing of an electrocatalyst comprising a porous carbon support material, a catalytic material in the form of at least one type of metal, and macrocyclic compounds chemically bound to the carbon support and capable of forming complexes with single metal ions of said metal or metals, said method comprising the steps of: i) providing a template capable of acting as pore structure directing agent during formation of a highly porous electrically conducting templated carbon substrate, ii) mixing the template with one or several precursor substances of the catalytic material, the macrocyclic compounds and carbon, iii) exposing the mixture of the template and the precursor substances to a carbonization process during which the precursors react and transform the mixture into a carbonized template composite in which the carbon part of the composite is chemically bound to macrocyclic compounds present in complexes with the metal or metals.

Embodiments of this method can be summarized as follows:

wherein the template comprises a porous solid or a mixture of porous solids.

wherein the porous solid is a metal oxide.

wherein the porous solid is silicon dioxide (silica) and/or an aluminium oxide (alumina).

wherein the template comprises a porous solid having an arrangement of its pores that is ordered on the length scale of 0.4-1000 nm.

wherein the porous solid has an arrangement of its pores that is ordered on the length scale of 2-50 nm.

wherein the template comprises a porous solid being an ordered mesoporous silica (OMS) where its pores have an order arranged on the length scale of 2-50 nm.

wherein the template comprises a porous solid metal that can be dissolved in a solvent.

wherein the template comprises one or more of a metal organic framework (MOF), a covalent organic framework (COF), or a zeolitic imidazolate framework (ZIF) material.

wherein the template comprises a polymer or a porous carbon.

wherein the precursor substance comprises sources of carbon, metal and macrocyclic compounds and elements that are capable of forming bonds between carbon and macrocyclic compounds, and between macrocyclic compounds and metal.

wherein the precursor substance comprises a metal salt or a dissolved metal salt in a solvent, preferably furfuryl amine.

wherein the precursor substance comprises any of the following elements: Sc, Ti, V, Cr, Mn, Fe, Co, Ni, Cu, Zn, Y, Zr, Nb, Mo, Tc, Ru, Rh, Pd, Ag, Cd, La, Ce, Nd, Sm, Eu, Gd, Lu, Hf, Ta, W, Re, Os, Ir, Pt, Au and/or Hg; preferably the precursor substance comprises any of the following elements: Ti, V, Mn, Fe, Co, Ni, Cu, Zn, Mo, Ru, Rh, Pd, Ag, Ce, Sm, Eu, Gd, W, Re, Ir, Pt and/or Au; more preferably the precursor substance comprises any of the following elements: V, Mn, Fe, Co, Ni, Cu, Zn, Mo, Ce and/or W.

wherein the precursor substance comprises a type of atom that forms a complex to the metal type used as catalyst.

wherein the precursor substance comprises compounds containing one or more of the following elements: nitrogen, sulphur, phosphorous, oxygen, boron or silicon capable of forming a complex to the metal type used as catalyst.

wherein the precursor substance comprises molecules that can react and form macrocyclic compounds.

wherein the precursor substance comprises molecules that can react and form macrocyclic compounds that become chemically bound to the carbon support and capable of forming complexes with single metal ions of the metal or metals used as catalytic material.

wherein the precursor substance comprises an amine that can react and form macrocyclic compounds that become chemically bound to the carbon support and capable of forming complexes with single metal ions of the metal or metals used as catalytic material, wherein the amine preferably acts as a source of both carbon and nitrogen for the final material.

wherein the amine is furfuryl amine.

wherein the precursor substance comprises macrocyclic compounds that become chemically bound to the carbon support and form complexes with single metal ions of the metal or metals used as catalytic material.

wherein the precursor substance comprises a catalyst for facilitating the carbonization process.

wherein the catalyst is paratoluene sulfonic acid, which may be dissolved in a solvent, and which preferably also act as a source of carbon and sulphur in the final material.

wherein the precursor substance comprises a catalyst for the carbonization process, which catalyst is introduced to the template prior to other precursor substances to ensure an efficient filling of the template with the catalyst before carbonization takes place.

wherein the precursor substance comprises a catalyst for the carbonization process, which catalyst is introduced to the template prior to other precursor substances by exposing the template to the catalyst dissolved in a solvent for a sufficient duration of time to allow for the catalyst to penetrate the template and subsequently drying the template impregnated with the catalyst for the carbonization process at a suitable temperature between 50 and 120° C. before addition of the other precursor substances.

wherein the precursor substance is added in several cycles involving mixing and pyrolysis in each cycle to achieve a higher filling degree of the template.

wherein the precursor substance polymerizes into a conducting polymer with sufficient electrical conductivity to alleviate the need for subsequent carbonization.

wherein the carbonization process resulting in the carbonized template composite involves heating of the mixture of the template and the precursor substance under inert, reducing or ammonia atmosphere to sufficient temperature for the precursor substance to polymerize and carbonize, the exact temperature depending on the choice of precursor substance but being in the range 100-2000° C.

wherein the carbonization process involves heating of the mixture of the template and the precursor substance under inert atmosphere to a temperature between 250-1400° C. for the precursor substance to polymerize and carbonize.

wherein the carbonization process involves heating of the mixture of the template and the precursor substance under inert or reducing atmosphere to sufficient temperature for the precursor substance to polymerize and carbonize and partly or completely graphitize (i.e. form graphite-like atomic order in parts of the material, while still maintaining the templated structure at a length scale larger than 2 nm).

wherein the method comprises the step of removing the template from the carbonized template composite.

wherein the template is removed from the carbonized template composite by exposing the composite to a treatment that selectively removes the template from the composite.

wherein removing the template comprises using a selective solvent, a selective oxidizer or a heat treatment the choice of which depends on the nature of the template.

wherein for the removal of a template consisting of a metal oxide a solvent consisting of a suitably selective acid or base is used.

wherein for the removal of a template consisting of silica a solvent consisting of hydrofluoric acid (HF) or an alkaline solution (e.g. NaOH(aq)) is used.

wherein for the removal of a template consisting of a metal, a solvent consisting of a strong acid such as nitric acid, sulphuric acid or phosphoric acid may be used.

wherein for the removal of a template consisting of organic material or amphiphilic supramolecular assemblies a UV/ozon treatment or a heat treatment under oxidizing conditions is used.

wherein the template comprises a supramolecular assembly of molecules, either preassembled prior to the addition of the precursor substance or co-assembled with precursor in the precursor substance upon addition of the precursor substance.

wherein the molecules in the supramolecular assembly comprises amphiphilic molecules.

wherein the molecules in the supramolecular assembly comprises block copolymer or surfactant.

wherein the molecules in the supramolecular assembly comprises polyethylene oxide-polypropylene oxide-polyethylene oxide (PEO-PPO-PEO) triblock copolymer.

wherein the molecules in the supramolecular assembly consist of block copolymer or surfactant that can stand the temperature needed for the polymerisation of the precursor substance.

wherein the molecules in the supramolecular assembly comprise metal salts and bridging ligands able to co-assemble into a metal organic structure.

wherein the molecules in the supramolecular assembly consist of bridging ligands being for example carboxylates or azoles.

wherein the molecules in the supramolecular assembly are mixed with a polymerisable precursor substance and the catalytic metal dissolved in a solvent.

wherein the polymerisable precursor substance is any carbon precursor that can be a polymerised in the presence of an amphiphile including compounds with benzene rings having at least one OH group thereon, including phenols, catechols, diols, aromatic diols, dihydroxyfenols, resorcinol, catechol, hydroquinone and compounds with benzene rings having at least one OH group and one or more amine groups, in combination with organic compounds that have a CO group, include aldehydes such as formaldehyde or acetaldehyde.

wherein the polymerisable precursor comprises any of the elements nitrogen, sulphur, phosphorous, boron, oxygen or silicon that can act as bridge between the formed polymer backbone and the catalytically active metal of the electrocatalyst.

wherein the solvent is formaldehyde and/or furfuryl amine or other solvent, such as ethanol, suitable for dissolving the precursor substrate without interfering with the subsequent chemical reactions of the manufacturing process.

wherein the precursor substance contains the active metal in an amount corresponding to between 0-40 weight-% of the final solid material content of the electrocatalyst, and polyethylene oxide-polypropylene oxide-polyethylene oxide triblock copolymer: resorcinol: formaldehyde: furfuryl amine present in ratio of 0.4-0.8:1:0.2-0.4:0.02-0.3 by weight and dissolved in ethanol.

wherein the precursor substance containing the active metal is added at a later stage but before the carbonization process.

wherein the precursor substance in the mixture is allowed to polymerize by employment of a heat treatment of the mixture.

wherein the heat treatment of a precursor substance containing resorcinol is 95-105° C.

wherein a polymerised composite is allowed to carbonize by heating it in an inert or reducing atmosphere to between 250 and 1400° C. for 1 to 24 hours and by optionally employing a catalyst for the carbonization reaction that is present in the precursor substance or included at a later stage of the process but before the carbonization process.

wherein the carbonization catalyst is triethyl orthoacetate or a compound with similar catalysing properties.

wherein the heat treatment is employed to remove partly or completely the supramolecular assembly template from the composite.

wherein the polymerized composite is exposed to a selective solvent such as an acidic aqueous ethanol solution to remove partly or completely the supramolecular assembly template from the composite.

wherein the molecules of the supramolecular assembly may have additional functional groups that either make them polymerisable or give them proton conducting properties or both of those effects.

The invention also concerns an electrocatalyst for electrochemical reactions that it is obtainable by a method according to any of the above claims.

The invention also concerns an electrocatalyst for electrochemical reactions, which electrocatalyst comprises a porous electrically conducting carbon substrate, a catalytic material in the form of at least one type of metal, macrocyclic compounds comprising carbon atoms and nitrogen, sulfur, oxygen, silicon, boron or phosphorous capable of forming complexes with single metal ions of the metal or metals used as catalytic material, wherein metal containing macrocyclic complexes are incorporated into and integrated with the carbon substrate material, and wherein said nitrogen, sulfur, oxygen, silicon, boron or phosphorous form bonds on the one hand to the metal ion and on the other hand to the carbon substrate.

Embodiments of the electrocatalyst can be summarized as:

wherein the electrochemical reaction involves transfer of charge carriers such as negative electrons or positive holes between reactants and the electrocatalyst.

wherein the electrochemical reaction involves transfer of charge carriers such as negative electrons or positive holes between reactants and the electrocatalyst and which reaction rate is increased by absorption of light in the UV to visible range of the electromagnetic spectrum and hence is either a complete photocatalyst or photovoltaic system or part of a photocatalyst or a photovoltaic system.

wherein the porous electrically conducting carbon substrate has a pore structure that has been deliberately structured (templated) by the use of a template such that the pore structure provides efficient mass transport of reactants to and from the electrocatalytically active sites that are chemically bonded to the carbon substrate via macrocyclic compounds and that are present throughout the carbon support.

wherein the template used is removable, transformable or constitute an integral part of the final electrocatalyst.

wherein the porous electrically conducting carbon substrate has a pore structure that has been deliberately structured (templated) by the use of a removable template such that the pore structure is controlled on the length scale of 0.4 nanometer to tens of micrometers and thus provides efficient mass transport of reactants to and from the electrocatalytically active sites that are chemically bonded to the carbon substrate via macrocyclic compounds and that are present throughout the carbon support.

wherein the porous electrically conducting carbon substrate has a pore structure that has been deliberately structured (templated) by the use of a removable template such that the pore structure is ordered on the length scale of 0.4 nanometer to tens of micrometers and thus provides efficient mass transport of reactants to and from the electrocatalytically active sites that are chemically bonded to the carbon substrate via macrocyclic compounds and that are present throughout the carbon support.

wherein the porous electrically conducting carbon substrate has an ordered mesoporous pore structure.

wherein the porous electrically conducting carbon substrate has an atomic structure in the walls enclosing its pores that provides a high electrical conductivity.

wherein the porous electrically conducting carbon substrate has an atomic structure in the walls that is partly or completely graphitized and thus provides a high electrical conductivity.

wherein the metal complexes contain one or more of any of the following elements: Sc, Ti, V, Cr, Mn, Fe, Co, Ni, Cu, Zn, Y, Zr, Nb, Mo, Tc, Ru, Rh, Pd, Ag, Cd, La, Ce, Nd, Sm, Eu, Gd, Lu, Hf, Ta, W, Re, Os, Ir, Pt, Au and/or Hg; preferably: Ti, V, Mn, Fe, Co, Ni, Cu, Zn, Mo, Ru, Rh, Pd, Ag, Ce, Sm, Eu, Gd, W, Re, Ir, Pt and/or Au; more preferably: V, Mn, Fe, Co, Ni, Cu, Zn, Mo, Ce and/or W.

The invention also concerns a method for manufacturing of a membrane electrode assembly (MEA) with gas diffusion layers (GDL's) suitable for use in fuel cell, said method comprising the steps of i) mixing an electrocatalyst material of the above type with an ionomer in the presence of a solvent, such as one or more lower aliphatic alcohols and if beneficial including water to prepare an ink, and ii) depositing the ink mixture thus obtained on to an ionomer membrane or onto a gas diffusion layer, and iii) sandwiching the ink mixture between the membrane and the gas diffusion layer, where the latter acts to provide gaseous reactants to the electrode and acts as current collector, and iv) sandwiching the obtained sandwich structure with a second electrode with GDL on the other side of the membrane, thus obtaining a MEA with GDL's for use in a fuel cell setup.

Embodiments of this method can be summarized as:
wherein mixing of electrocatalyst and ionomer is done in a weight ratio of catalyst-to-ionomer within the range 0.05-20.
wherein sandwiching of the components in the MEA is done by pressing the components together at pressures in the range from 0.1 to 100 bar overpressure and optionally simultaneously applying heating of the sandwiched components in the range from room temperature to 200° C.
wherein the second electrode comprises an electrocatalyst different from that contained in said ink mixture.
wherein the gas diffusion layer is pretreated so as to give it a porous layer with high electrical conductivity and desired hydrophilic/hydrophobic balance so as to facilitate mass transport of reactants and products.
wherein the ionomer is a proton-conducting polymer, such as Nafion™.
wherein the ink mixture is deposited on to a proton-conducting membrane, such as of the polymer Nafion™.

The invention also concerns a fuel cell having a first and a second electrode, wherein at least one of said electrodes comprises an electrocatalyst of the above type.

DETAILED DESCRIPTION OF THE INVENTION

Figure 1:
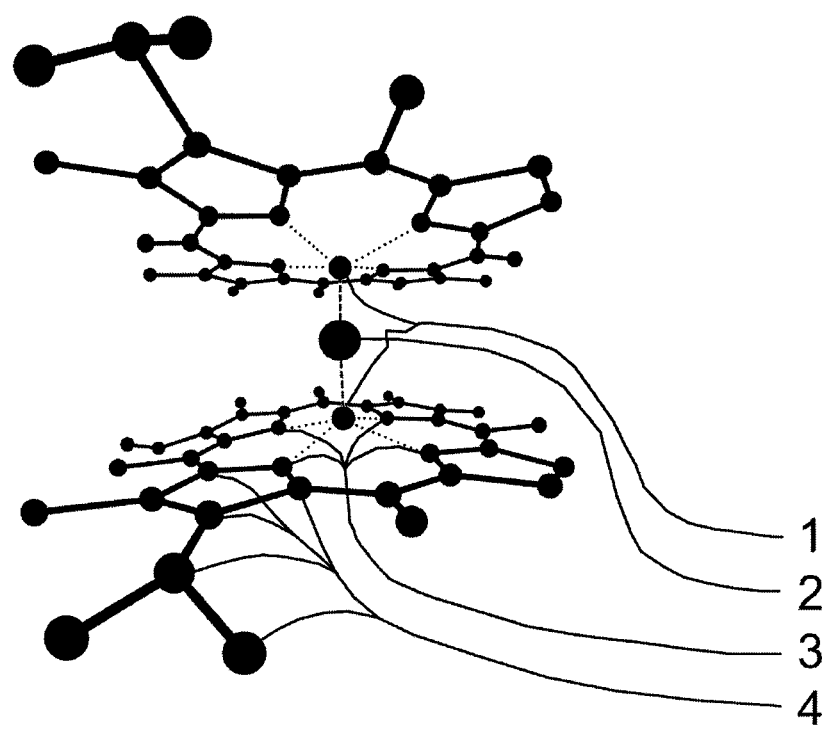
FIG. 1. shows a cut-out part of a schematic representation of a local chemical structure of an electrocatalyst of the inventive type.

FIG. 1. shows a cut-out part of a schematic representation of a local chemical structure of an electrocatalyst of the inventive type described, illustrating atoms as black balls and covalent chemical bonds as solid straight lines between balls, exemplified by two metal atoms (1) both coordinating (dashed lines) a reactant atom, such as an oxygen atom (2), and each being coordinated (dotted lines) to four bridging atoms, such as nitrogen (3), bridging the metal atoms to carbon atoms (4) being part of the electrically conducting, high surface area and highly porous templated carbon structure described, and which continues beyond the termination of the illustrated structure, but which is removed for easier view.

Figure 2:
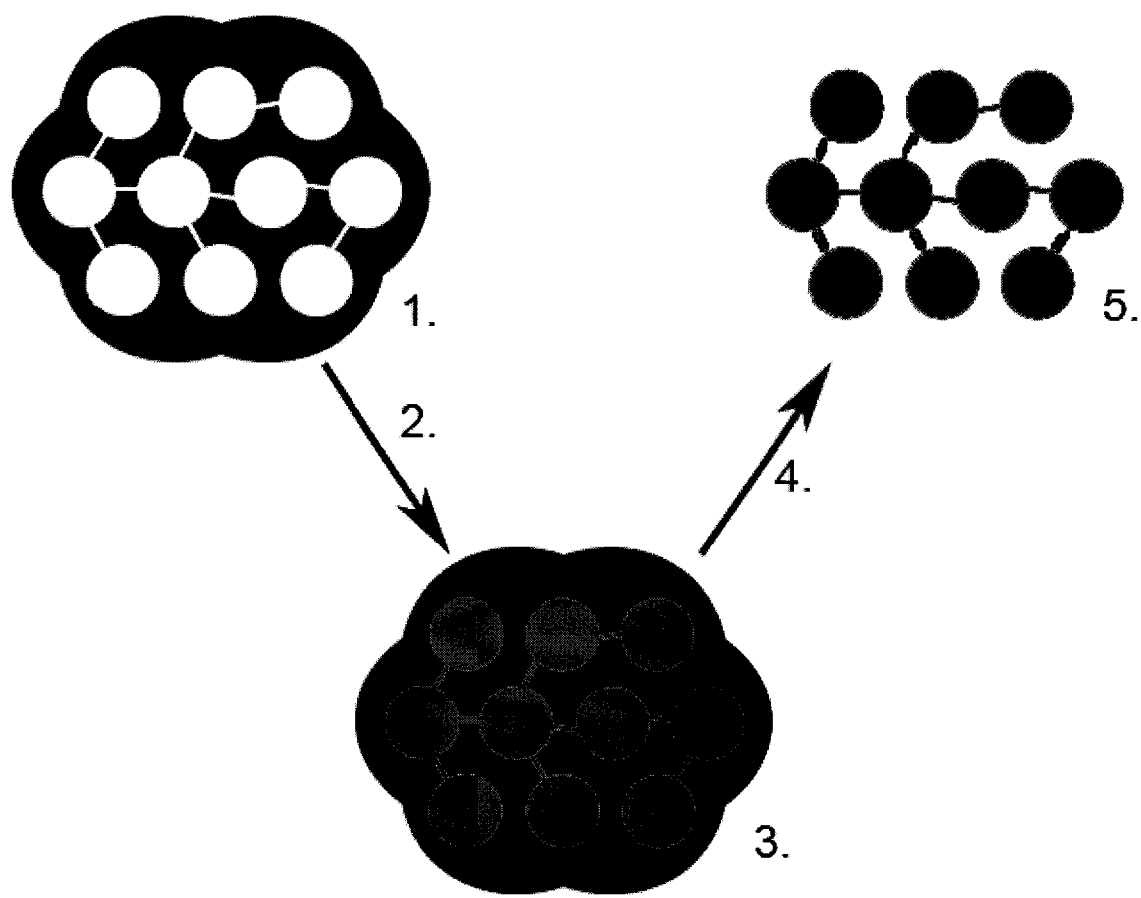
FIG. 2. shows a schematic diagram illustrating an example of a process of manufacturing an inventive electrocatalyst with active sites of the type illustrated in FIG. 1.

FIG. 2. shows a schematic diagram illustrating an example of a process of manufacturing an inventive electrocatalyst with active sites of the type illustrated in FIG. 1, incorporated in and integrated with the electrically conducting, high surface area and highly porous templated carbon structure. A template (1) is impregnated by precursor substance which is allowed to react and carbonize (2) and thus forms a composite between the template and the electrocatalyst with active sites integrated into the formed carbon support (3), where after the template is removed by selective dissolution (4) leaving the inventive electrocatalyst as remaining product (5).

Figure 3:
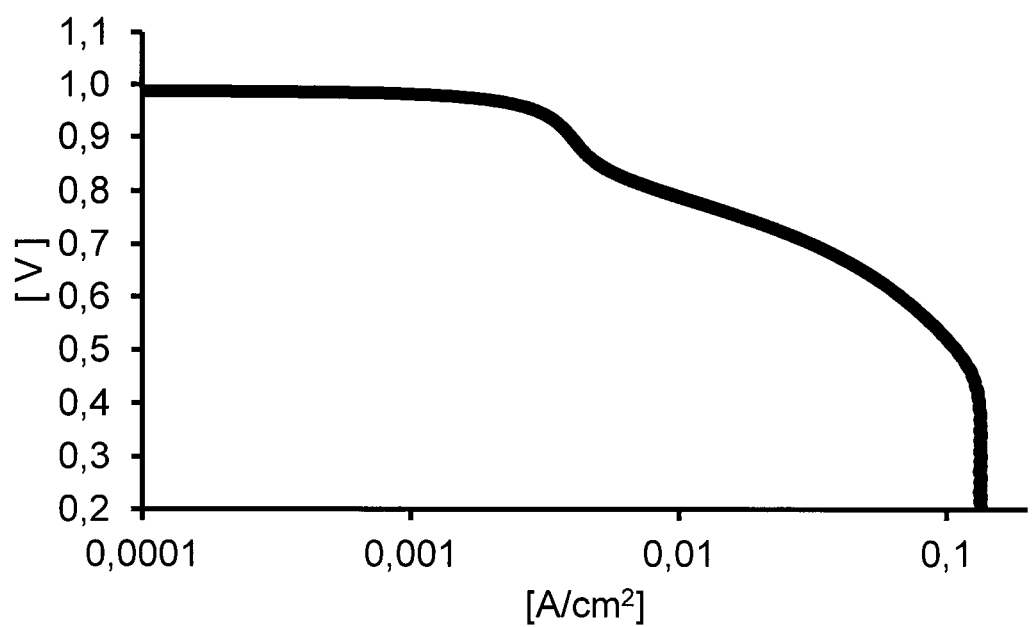
FIG. 3. shows a polarization curve of MEA prepared with an inventive, in this example Fe-based, cathode electrocatalyst and commercial Pt-based anode electrocatalyst (cell voltage [V] versus current density [A/cm$^2$].

FIG. 3. Polarization curve of MEA prepared with the inventive Fe-based cathode electrocatalyst and commercial Pt-based anode electrocatalyst showing cell voltage [V] versus current density [A/cm$^2$]. The fuel cell was operated at 70° C. with 100% humidity and fuelled by oxygen (100%, 30 ml/min) and hydrogen (5.7% in Ar, 30 ml/min), with a theoretical maximum of the current density of 0.13 A/cm$^2$, which is reached at around 0.5 V cell voltage.

The invention concerns an electrode material consisting of a highly porous electrically conducting templated carbon with a high specific surface area supporting, through chemical bonds, electrocatalytically active sites consisting of metal complexes in which single metal ions form complexes with ligands containing a bridging element such as nitrogen bonded on the one hand to the metal ion and on the other hand to the carbon support.

In the description of the invention, the highly porous electrically conducting templated carbon with a high specific surface area support may be any suitable electrically conducting carbon material with high surface area and porosity deliberately structured at the micro-, meso- and macroscale during their preparation by the use of a template, which may be either in molecular or supramolecular assembly form or in the form of a liquid or a solid that may be selectively removed from the carbon once it has been formed in the presence of the template or optionally left in the electrocatalyst. Such carbons are called templated carbons or templated carbon materials. Examples of suitable carbon materials are, for example, ordered mesoporous carbons (OMC) and disordered mesoporous carbons, mesocellular foams of carbon and inverse colloidal crystal structures of carbon. The porosity and surface area of templated carbon materials may be tuned within a wide range from subnanometer to micrometers, so as to fit the mass transport requirements of the application they are aimed for through choice of template type and processing conditions, and the atomic ordering of the carbon, which may range from amorphous to ordered form, as affected by the synthesis precursors used and the processing conditions employed.

In the invention, the supported electrocatalytically active sites consisting of metal complexes in which single metal ions form complexes with ligands containing a bridging element such as nitrogen bonded on the one hand to the metal ion and on the other hand to the carbon support, may be any electrocatalytically active sites based on metal-organic complexes, including, but not limited to, $N_4$— or $N_2$-chelate compounds like metalloporphyrins, porphyrins, phtalocyanines and tetraazaannulenes or other metal-containing complexes with bridging elements consisting of nitrogen, sulfur, phosphorous, oxygen, boron or silicon, or combinations thereof. The type of metal ion may be any electrocatalytically active metal ion, including, but not limited to, the transition metal elements, Sc, Ti, V, Cr, Mn, Fe, Co, Ni, Cu, Zn, Y, Zr, Nb, Mo, Tc, Ru, Rh, Pd, Ag, Cd, La, Ce, Nd, Sm, Eu, Gd, Lu, Hf, Ta, W, Re, Os, Ir, Pt, Au, Hg.

It is furthermore possible to simultaneously incorporate more than one of these types of metal ion complexes in the electrode material. One added value of that is the achievement of an improved fuel tolerance of the cathode electrode. The atom-% of the metal in the electrocatalyst may be varied in the range from 0 to 40% of the overall elemental composition of the material.

The invention also concerns the manufacture of the electrocatalyst material, which may be done using an ordered mesoporous silica (OMS) material as template during the formation of the electrode material. By impregnating the OMS with a mixture of precursors containing the metal, the complex bridging element and carbon in suitable proportions and of suitable types mixed in a suitable solvent and adding a compound acting as a catalyst for the subsequent carbonization process, and subsequently drying and heat treating the impregnated OMS material in a suitable atmosphere and at a suitable temperature, a composite of the OMS and the electrode material is obtained. The process of impregnation and carbonization may be repeated several times for more complete filling of the pores of the OMS material or to achieve any other added value. The OMS material can then be selectively removed from the composite by exposure to HF acid or to an alkaline solution of e.g. NaOH thus yielding, after washing and drying, the electrode material.

An example of a suitable synthesis protocol following this approach is as follows. An OMS material such as KIT-6 is prepared in a conventional manner (See e.g. S. H. Choi et al., Chemical Communications, vol. 1, pp. 2136-2137, 2003). The OMS material is covered with 0.5 M paratoluene sulfonic acid (PTSA>98% from Merck) in ethanol for one hour. The PTSA acts as a catalyst and as a source of carbon and sulfur in the subsequent carbonization process. Next the OMS-PTSA mixture is vacuum-filtered, washed with a small amount of ethanol and subsequently dried for two hours at 80° C. Following this, a saturated $CoCl_2$ solution dissolved in furfuryl amine (>99% from Aldrich) is added, where the furfuryl amine acts both as carbon and nitrogen source for the final material. The mixture is then pyrolysed at 800° C. under inert atmosphere resulting in polymerization of the furfuryl amine and carbonization. The process of impregnation and pyrolysis is repeated three times to ensure high degree of pore-filling. At the third pyrolysis step, the temperature is 950° C. Finally, the pyrolysed material is immersed in hydrofluoric acid (40%) for 24 hours to remove the OMS template and the remaining ordered mesoporous carbon-based electrocatalyst is rinsed with ethanol and water, and dried before use.

In the inventive method, various OMS materials can be used and various soluble metal salts of various desired metal ions could be used alone or in combination. The furfuryl amine could be any suitable nitrogen containing compound which can be incorporated in a carbon matrix via a pyrolysis treatment. The PTSA could be any suitable sulfur containing catalyst suitable for polymerization of organic compounds. The metal salt may be mixed with the PTSA and introduced to the OMS with the PTSA instead of being mixed with the furfuryl amine and introduced to the OMS-PTSA. The solvent used may be any suitable solvent that can dissolve the precursors used in the preparation. The temperature treatments used may be adjusted within a broad range covering at least 100 to 2000° C. depending on which precursors are used. The final removal of the OMS could be done using a concentrated aqueous solution of NaOH. The desired metal-containing and electrocatalytically active complex can be added to the synthesis, pre-prepared and ready-made with suitable bridging groups, during the impregnation of the OMS or the OMS-PTSA. The above alternatives can be combined in various ways.

For a more efficient manufacturing of the electrocatalyst material a method may be used relying on the co-assembling properties of a surface active molecule mixed with one or more precursors for the desired electrocatalytically active site without the need for a silica template. An efficient electrocatalyst material is obtained by mixing a polyethylene oxide-polypropylene oxide-polyethylene oxide (PEO-PPO-PEO) triblock copolymer with a solution containing resorcinol, formaldehyde and furfuryl amine saturated with iron chloride in suitable ratios of, e.g. polymer:resorcinol:formaldehyde:furfuryl amine=0.6:1:0.3:0.1, by weight and then baking and carbonizing the mixture. The mixture may be dissolved in a solvent like ethanol for improvement of the polymerization of the carbon precursor. A suitable temperature for this stage is 95-105° C. It is also beneficial to use a catalyst, such as triethyl orthoacetate or a reaction aid, to accelerate a carbonization reaction between the surfactant and the carbon precursor and for the reactions taking place during the formation of the material. Following the polymerization stage the mixture is baked at 400° C. for 3 h and then 800° C. for 6 hours in an inert atmosphere to carbonize the polymer formed and to remove the surface active triblock copolymer thereby obtaining the target material. The type of metal ion complex incorporated may include any electrocatalytically active metal ion, including, but not limited to, the transition metal elements, Sc, Ti, V, Cr, Mn, Fe, Co, Ni, Cu, Zn, Y, Zr, Nb, Mo, Tc, Ru, Rh, Pd, Ag, Cd, La, Ce, Nd, Sm, Eu, Gd, Lu, Hf, Ta, W, Re, Os, Ir, Pt, Au, Hg. Especially suitable metals are Ti, V, Mn, Fe, Co, Ni, Cu, Zn, Mo, Ru, Rh, Pd, Ag, Ce, Sm, Eu, Gd, W, Re, Ir, Pt, and Au. Of extra special interest are V, Mn, Fe, Co, Ni, Cu, Zn, Mo, Ce, and W. It is furthermore possible to simultaneously incorporate more than one of these types of metal ion complexes in the electrode material. One added value of that is the achievement of an improved fuel tolerance of the cathode electrode. The atomic-% of the metal loading in the electrocatalyst may be varied in the range from 0 to 40% of the total elemental composition of the material. The resorcinol may be replaced by any carbon precursor that can be polymerized in the presence of a surfactant and other examples involve compounds with benzene rings having at least one OH group thereon, include phenols and cathecols or resorcinol amines, in combination with organic compounds that have a CO group, include aldehydes, such as formaldehyde or acetaldehyde. The temperature and duration used for the temperature treatment can be adjusted to fit the specific mixture of precursors and surface active compounds and to give the final material improved properties. The surface active compound may be any surface active compound that has the capability of co-assembling with the precursors of the desired material and can stand the temperature needed for polymerization of the carbon containing precursor. The precursors used may include compounds that contain nitrogen, sulfur, phosphorus, oxygen or silicon providing the necessary bridging element between the carbon and the electrocatalytically active site. The weight ratios used on preparing the mixture may be changed to give better material and will depend on type of surface active compound and precursors used. The solvent used may be changed to fit the choice of precursors and temperature used. The metal precursor used may be introduced at a different stage during the formation of the material, but before the carbonization process of the material. The process may be made under any of alkaline or acidic conditions.

The invention also concerns the application of the electrode material in the application as cathode in hydrogen-fuelled fuel cells. By mixing the electrode material in a suitable ratio (within the range of 1-99%, by weight) with a proton conducting material, such as the proton conducting polymer Nafion™, in the presence of a solvent, such as a blend of ethanol and propanol, and depositing the ink mixture thus obtained on to a proton conducting membrane of Nafion™. For the preparation of a membrane electrode assembly an anode catalyst is attached in a similar fashion on the other side of the membrane thus making a membrane-electrode-assembly (MEA). A number of MEA layers are stacked together with gas diffusion layers and bipolar plates to form a fuel cell according to conventional and non-conventional methodology. The proton conducting material may be any material that can conduct protons at the temperature of operation and provide the electrocatalyst with protons. The application of the electrode material may also be as an anode in hydrogen fuelled fuel cells. The hydrogen fuelled fuel cell may also be fuelled by methanol or dimethyl ether. The solvent for nafion may be any solvent that is suitable for dissolving nafion. The cathode may be feed with oxygen or air or any other suitable oxidant. The application of the electrocatalyst described may be any other catalytic, electrocatalytic, photocatalytic, or photoelectric application in which redox catalysis is a part. The preparation of the MEA may be done using any other method that yields a good performance of the MEA, such as deposition of the ink mixture containing the electrode material on the gas diffusion layer and then pressing this together with the proton conducting membrane.

The inventive electrocatalyst type is different from conventional electrocatalyst based on metal complexes since it enables the combination of such highly active and selective electrocatalytic active sites for the preferred reaction (high turn-over-frequencies) with an electrically conducting support having properties such as large interface area between the three-phase boundary between the gas phase, the liquid phase and the solid phases present in the fuel cell device which allows for efficient transport of reactants and products to the electrocatalyst active sites, through which efficient transfer of ions and electrons between reactants are facilitated. This difference is due to the hierarchical structure of the inventive electrocatalyst which has a structure at the atomic level that provides a high turn-over-frequency for the desired reaction, while it has also a structure at the atomic level that efficiently connects electrically the active site with the electrically conducting support, while it has also a structure at the atomic level of the support such that the electrical conductivity of the support is high, while it has also a structure at the nanometer and micrometer length scale that provides a porosity in the sub-nanometer to tens of micrometer range that efficiently provides a large three-phase interface area between the gas, liquid and solid phases as well as efficient mass transport properties of gas, liquid, reactants and products of the reaction, and electrons to this three-phase interface boundary.

The inventive electrocatalyst type is different from electrocatalysts based on ordered mesoporous carbons containing metal particles in the range of 1-50 nm because metal particles exhibit different electrochemical properties than active sites consisting of metal complexes in which there is typically a single metal ion (and sometimes perhaps a small cluster of around 2-3 metal ions) per active site as in the present invention. Also the amount of metal is lower and may in some cases be as low as the detection limit of available instruments in the described electrocatalyst, which is lower than that of electrocatalysts based on ordered mesoporous carbons containing metal particles. Furthermore the materials described here show excellent four-electron transfer reaction for the oxygen reduction reaction as expected for the type of metal complexes described and distinct from most non-noble metal particles. The inventive material has also been shown to work in a real fuel cell application and not only been tested in a rotating disc electrode (RDE) or rotating ring disc electrode (RRDE) setup, which takes place at very different and partly unrealistic conditions for fuel cell operation.

The methods of preparation of the inventive electrocatalyst based on the silica template method is different from other methods used to prepare electrocatalysts based on ordered mesoporous carbons containing metal particles using the silica template method since the nitrogen-containing carbon source used in our case is preferably a furfuryl amine or similar compound that allows for the formation of the desired metal complexes and their integration with the carbon support, rather than one of the following; quinoxaline, propylene diamine, 4,4-dipyridyl and phenanthroline, which promote the formation of metal nanoparticles instead of metal complexes.

The methods of preparation of the inventive electrocatalyst based on the method without the silica template is different from other methods used to prepare electrocatalysts based on ordered mesoporous carbons containing metal particles without the silica template method since they introduce the metal particles after formation of the ordered mesoporous carbon by impregnation of a salt followed by a heat treatment or by introduction of a colloidal suspension of the metal particle, therefore obtaining a different material from the ones described here. Such methods lead to supported metal or metal oxide nanoparticles instead of the characteristic metal complexes of the inventive electrocatalyst.

In summary the invention refers to an electrocatalyst for electrochemical reactions, which electrocatalyst comprises a high surface area, porous templated carbon substrate material, such as ordered mesoporous carbons (OMC), mesocellular foams of carbon and inverse colloidal crystal structures of carbon, and a catalytic material in the form of at least one type of metal. The electrocatalyst further comprises macrocyclic compounds capable of forming complexes with single metal ions of the metal or metals used as catalytic material. Examples of such compounds are $N_4$-chelate compounds like metalloporphyrins, porphyrins, phtalocyanines, tetraazaannulenes, so called "hangman" complexes and their analogues, and other macrocyclic compounds comprising nitrogen, sulfur, oxygen, silicon, boron or phosphorous capable of binding to the catalytic metal(s) such as to form a metal-containing complex. These macrocyclic compounds are referred to as metal containing macrocyclic compounds when they have formed a complex with the metal ion. In the inventive electrocatalyst the metal containing macrocyclic compounds are incorporated into and integrated with the templated carbon substrate material. Thus, metal complexes in which metal ions form complexes with ligands containing a bridging element such as nitrogen, sulfur, oxygen, silicon, boron or phosphorous bonded on the one hand to the metal ion and on the other hand to the carbon support, are incorporated into and integrated with the templated carbon substrate material. Principally, each single metal ion distributed in this way forms an active site of the inventive catalyst. The invention also concerns methods for production of the inventive electrocatalyst. The invention also concerns application of the inventive electrocatalyst in any catalytic, electrocatalytic, photocatalytic, or photoelectric application that relies on redox catalysis. An example of such an application is a fuel cell having a first and a second electrode, wherein at least one of said electrodes comprises the inventive electrocatalyst. The invention also concerns the making of membrane electrode assembly with gas diffusion layers for use in fuel cells.

The template does not necessarily have to be entirely removed, instead at least a part of the template may form an integral part of the electrocatalyst material.

The invention claimed is:

1. A method for manufacturing of an electrocatalyst comprising a porous carbon support material and a catalytic material of metal complexes of macrocyclic compounds chemically bound to the carbon support, said method comprising the steps of:
   i) providing a template capable of acting as pore structure directing agent during formation of a highly porous electrically conducting template carbon substrate;
   ii) mixing the template with 1) one or several precursor substances of the carbon support, 2) one or several precursor substances of the macrocyclic compounds, and 3) one or several source(s) of metal(s) or one or several source(s) of metal(s) in a solvent, wherein the precursor substances of the carbon support and the precursor substances of the macrocyclic compounds may be the same or different and are precursors of $N_2$— or $N_4$-chelate compounds; and
   iii) exposing the mixture of the template, the precursor substances, and the source(s) of metal(s)to a carbonization process during which the precursor substances react and transform the mixture into a carbonized template composite in which the carbon part of the composite is chemically bound to the macrocyclic compounds and the macrocyclic compounds form complexes with the metal(s).

2. The method of claim 1 wherein the template is selected from the group consisting of porous solids and surface active molecules.

3. The method of claim 2 wherein the template is selected from the group consisting of an ordered mesoporous silica (OMS) material, a metal organic framework (MOF) material, a covalent organic framework (COF) material, a zeolitic imidazolate framework (ZOF) material, and mixtures thereof.

4. The method of claim 2 wherein the surface active molecule is a block copolymer or a surfactant.

5. The method of claim 1 further comprising the step of removing the template from the carbonized template composite.

6. The method of claim 1 wherein steps ii) and iii) are repeated.

7. The method of claim 1 wherein the precursor substance(s) is/are polymerized into a conductive polymer before step iii).

8. The method of claim 1 wherein at least one precursor of the carbon support, at least one precursor of the macrocyclic compounds and at least one metal salt are used.

9. The method of claim 1 wherein the metal(s) is(are) selected from transition metals.

10. The method of claim 1 wherein the precursor of the macrocyclic compounds comprises an amine compound that can react and form macrocyclic compounds that become chemically bound to the carbon support and capable of forming complexes with single metal ions of the metal(s).

11. The method of claim 10 wherein the amine acts as a source of both carbon and nitrogen for the final material.

12. The method of claim 10 wherein the amine compound is furfuryl amine.

13. The method of claim 1 wherein step ii) comprises including a catalyst for facilitating the carbonization process.

14. The method of claim 13 wherein the catalyst is p-toluene sulfonic acid.

15. An electrocatalyst obtained by the method of claim 1.

16. A method for manufacturing of a membrane electrode assembly (MEA) with gas diffusion layers (GDLs) suitable for use in a fuel cell, said method comprising the steps of:
   i) mixing an electrocatalyst obtained by the method of claim 1 with an ionomer in the presence of a solvent,
   ii) depositing the ink mixture thus obtained onto an ionomer membrane or onto a gas diffusion layer;
   iii) sandwiching the ink mixture between the membrane and the gas diffusion layer, where the latter acts to provide gaseous reactants to the electrode and acts as current collector; and
   iv) sandwiching the obtained sandwich structure with a second electrode with GDL onto the other side of the membrane, thus obtaining a MEA with GDLs for use in fuel cell setup.

17. An electrocatalyst for electrochemical reactions, which electrocatalyst comprises a porous electrically conducting carbon substrate, a catalytic material in the form of at least one type of metal, macrocyclic compounds comprising carbon atoms and nitrogen, sulphur, oxygen, silicon, boron or phosphorous, which macrocyclic compounds form complexes with single metal ions of the catalytic material, wherein the metal containing macrocyclic complexes are incorporated into and integrated with said porous electrically conducting carbon substrate, and wherein said nitrogen, sulphur, oxygen, silicon, boron or phosphorous form(s) bonds on the one hand to the metal ion and on the other hand to said porous electrically conducting carbon substrate.

18. The electrocatalyst of claim 17 wherein the porous electrically conducting carbon substrate has an ordered mesoporous pore structure.

19. The electrocatalyst of claim 17 wherein the macrocyclic complexes are selected from the group consisting of N4- and $N_2$-chelate compounds.

20. The electrocatalyst of claim 19 wherein the macrocyclic complexes are selected from the group consisting of metalloporphyrins, porphyrins, phthalocyanins and tetraazaannulenes.

21. Fuel cell having a first and a second electrode, wherein at least one of said electrodes comprises an electrocatalyst of claim 15 or 17.

* * * * *